(12) United States Patent
Schilling et al.

(10) Patent No.: US 11,156,474 B2
(45) Date of Patent: *Oct. 26, 2021

(54) ADAS HORIZON AND VISION SUPPLEMENTAL V2X

(71) Applicant: VEONEER US INC., Southfield, MI (US)

(72) Inventors: Robert Schilling, Londonderry, NH (US); Scott A. Nist, Hartland, MI (US)

(73) Assignee: VEONEER US INC., Southfield, MI (US)

(*) Notice: Subject to any disclaimer, the term of this patent is extended or adjusted under 35 U.S.C. 154(b) by 276 days.

This patent is subject to a terminal disclaimer.

(21) Appl. No.: 16/169,250

(22) Filed: Oct. 24, 2018

(65) Prior Publication Data

US 2019/0056238 A1 Feb. 21, 2019

Related U.S. Application Data

(63) Continuation of application No. 15/238,828, filed on Aug. 17, 2016, now Pat. No. 10,139,244.

(51) Int. Cl.
*G01C 21/36* (2006.01)
*G01S 19/42* (2010.01)
(Continued)

(52) U.S. Cl.
CPC ........ *G01C 21/3691* (2013.01); *G01S 5/0072* (2013.01); *G01S 19/13* (2013.01);
(Continued)

(58) Field of Classification Search
None
See application file for complete search history.

(56) References Cited

U.S. PATENT DOCUMENTS 6,405,132 B1* 6/2002 Breed .................. G01S 7/4802
701/301
7,545,261 B1 6/2009 Harrington
(Continued)

FOREIGN PATENT DOCUMENTS

EP 2878508 6/2015

OTHER PUBLICATIONS

A Cooperative Collision Warning System Based on Digital Map and Dynamic Vehicle Model Fusion, International Conference on Financial Cryptography and Data Security, Nov. 29, 2015, 139-151.

*Primary Examiner* — Robert T Nguyen
(74) *Attorney, Agent, or Firm* — Christopher P. Maiorana, PC

(57) ABSTRACT

An apparatus comprising an antenna, a processor and a memory. The antenna may be configured to receive signals from GNSS satellites. The processor may be configured to execute instructions. The memory may be configured to store instructions that, when executed, perform the steps of (i) calculating first location and velocity data based on the signals received from the GNSS satellites, (ii) calculating a first most probable path based on map information, (iii) receiving second location and velocity data, (iv) determining a second most probable path, (v) performing a comparison of (a) the first location and velocity data and the first most probable path to (b) the second location and velocity data and the second most probable path and (vi) determining a probability of collision based on the comparison.

18 Claims, 12 Drawing Sheets

(51) Int. Cl.
*G01S 19/52* (2010.01)
*G01S 5/00* (2006.01)
*H04W 4/02* (2018.01)
*H04W 4/46* (2018.01)
*G01S 19/13* (2010.01)
*G08G 1/16* (2006.01)
*G01S 19/48* (2010.01)
*H04W 4/70* (2018.01)
*G06N 7/00* (2006.01)

(52) U.S. Cl.
CPC .............. *G01S 19/42* (2013.01); *G01S 19/48* (2013.01); *G01S 19/52* (2013.01); *G06N 7/005* (2013.01); *G08G 1/161* (2013.01); *G08G 1/163* (2013.01); *G08G 1/165* (2013.01); *G08G 1/166* (2013.01); *G08G 1/167* (2013.01); *H04W 4/70* (2018.02); *H04W 4/023* (2013.01); *H04W 4/46* (2018.02)

(56) References Cited

U.S. PATENT DOCUMENTS

| | | | |
|---|---|---|---|
| 7,991,551 B2 | 8/2011 | Samuel et al. | 701/301 |
| 7,991,552 B2 | 8/2011 | Samuel et al. | 701/301 |
| 9,037,404 B2 | 5/2015 | Ibrahim | 701/1 |
| 9,079,587 B1 | 7/2015 | Rupp et al. | 701/23 |
| 9,099,003 B2 | 8/2015 | Dedes et al. | |
| 9,151,625 B2 | 10/2015 | Lee | 701/468 |
| 9,157,761 B2 | 10/2015 | Levin | 701/301 |
| 9,159,231 B2 | 10/2015 | Noh | 701/1 |
| 9,214,086 B1 | 12/2015 | Onishi | 340/905 |
| 10,139,244 B2 * | 11/2018 | Schilling | G08G 1/167 |
| 10,540,894 B2 * | 1/2020 | Goto | H04W 4/40 |
| 2005/0073438 A1 | 4/2005 | Rodgers | |
| 2005/0273258 A1 | 12/2005 | MacNeille et al. | 701/300 |
| 2007/0043502 A1 | 2/2007 | Mudalige | |
| 2007/0109111 A1 | 5/2007 | Breed | |
| 2008/0065328 A1 * | 3/2008 | Eidehall | G01S 7/295 701/301 |
| 2010/0169009 A1 * | 7/2010 | Breed | G01S 19/17 701/301 |
| 2010/0292871 A1 | 11/2010 | Schultz et al. | 701/3 |
| 2011/0301839 A1 * | 12/2011 | Pudar | H04W 4/046 701/408 |
| 2013/0021146 A1 | 1/2013 | Stegmaier et al. | 340/436 |
| 2013/0187792 A1 | 7/2013 | Egly | 340/901 |
| 2013/0289868 A1 | 10/2013 | Aso et al. | 701/301 |
| 2015/0072676 A1 * | 3/2015 | Jordan | G01S 5/0027 455/426.1 |
| 2017/0154531 A1 * | 6/2017 | Funabashi | G01C 21/30 |
| 2017/0227968 A1 * | 8/2017 | Klinger | H01Q 3/26 |
| 2017/0314954 A1 * | 11/2017 | Golding | G01C 21/3602 |
| 2017/0336788 A1 * | 11/2017 | Iagnemma | G05D 1/0246 |
| 2017/0368937 A1 * | 12/2017 | Bostick | B60W 30/0956 |
| 2020/0201356 A1 * | 6/2020 | Schuh | B60T 7/12 |

* cited by examiner

352 START

354 CALCULATE LHS DATA FROM GNSS SIGNALS

356 CALCULATE MOST PROBABLE PATH FROM ADAS HORIZON

358 COMMUNICATE WITH NEARBY VEHICLE

360 RECEIVE LHS FROM NEARBY VEHICLE

362 CAN NEARBY VEHICLE CALCULATE MPP DATA?

YES → 366 RECEIVE MPP CALCULATED BY NEARBY VEHICLE

NO ↓

364 CALCULATE MOST PROBABLE PATH OF NEARBY VEHICLE

368 COMPARE LHS AND MPP TO LHS AND MPP OF NEARBY VEHICLE

370 OUTPUT PROBABILITY OF COLLISION WITH NEARBY VEHICLE

372 END

ADAS HORIZON AND VISION SUPPLEMENTAL V2X

This application relates to U.S. Ser. No. 15/238,828, filed Aug. 17, 2016, which is incorporated by reference in its entirety.

FIELD OF THE INVENTION

The invention relates to global positioning generally and, more particularly, to a method and/or apparatus for implementing an advanced driver assistance system (ADAS) with a horizon and vision supplement for vehicle to infrastructure or vehicle to vehicle communication.

BACKGROUND

Conventional Vehicle to Vehicle and/or Vehicle to Infrastructure systems (V2X) were envisioned in 1997 and investigated by the CAMP (Crash Avoidance Metrics Partnership) Consortium (Mercedes, GM, Toyota, Ford and Honda) in the mid 2000's. Vehicles communicate to each other over a 5.9 GHz Dedicated Short Range Communication (DSRC) Wireless Access in Vehicular Environments (WAVE) Radio. Vehicles transmit location, heading and speed over ground to each other so that each can process information into collision avoidance algorithms to create driver warnings or to take actions (apply brakes) to avoid collision and save lives.

The U.S. government is reportedly close to issuing a mandate in 2017 for the inclusion of V2X systems in new cars starting in model year 2020. There have been many demonstrations of prototype systems that receive positional information from another vehicle, process collision algorithms and generate driver warnings or take other actions. Conventional demonstrations show vector solutions and tend to take place in parking lots and use mock-up city streets with no knowledge of actual roads.

It would be desirable to implement an ADAS horizon and/or vision supplement to a V2X infrastructure.

SUMMARY

The invention concerns an apparatus comprising an antenna, a processor and a memory. The antenna may be configured to receive signals from GNSS satellites. The processor may be configured to execute instructions. The memory may be configured to store instructions that, when executed, perform the steps of (i) calculating first location and velocity data based on the signals received from the GNSS satellites, (ii) calculating a first most probable path based on map information, (iii) receiving second location and velocity data, (iv) determining a second most probable path, (v) performing a comparison of (a) the first location and velocity data and the first most probable path to (b) the second location and velocity data and the second most probable path and (vi) determining a probability of collision based on the comparison.

BRIEF DESCRIPTION OF THE FIGURES

Embodiments of the invention will be apparent from the following detailed description and the appended claims and drawings in which:

FIG. 12 is a flow diagram illustrating a method for determining most probable path data based on vehicle capabilities.

DETAILED DESCRIPTION OF THE EMBODIMENTS

Embodiments of the present invention include providing a driver assistance system that may (i) provide a horizon and vision supplement to V2X communication, (ii) use knowledge of existing roads to improve collision detection, (iii) use knowledge from video analysis to improve collision detection, and/or (iv) be implemented as one or more integrated circuits.

Figure 1:
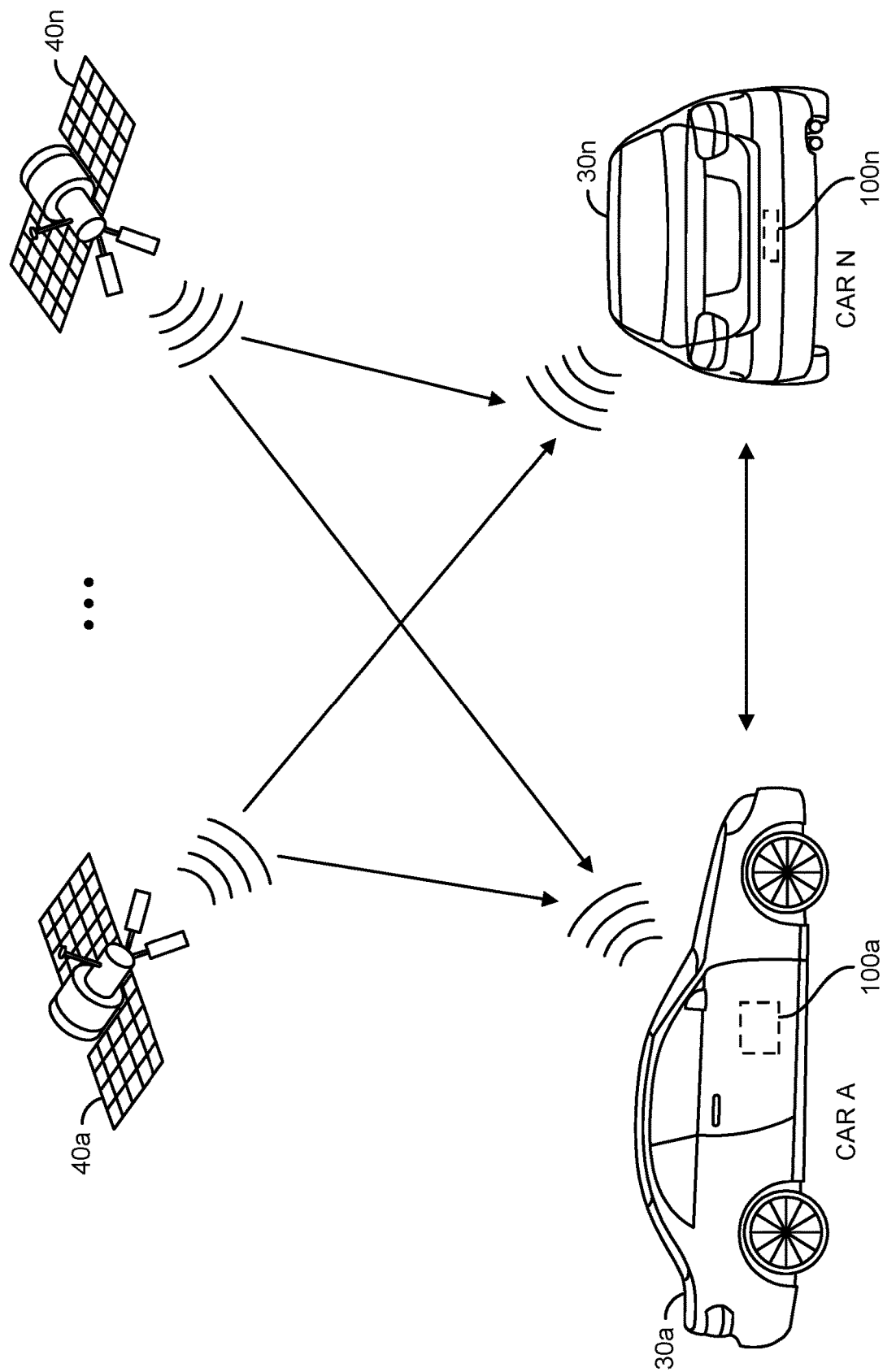
FIG. 1 is a diagram illustrating an apparatus installed in vehicles in a V2X system.

Referring to FIG. 1, a diagram illustrating a system 20 is shown. The system 20 may comprise an implementation of Vehicle to Vehicle and/or Vehicle to Infrastructure (V2X) systems. The system 20 may comprise vehicles 30a-30n communicating with each other and receiving communications from Global Navigation Satellite System (GNSS) satellites 40a-40n. The number of vehicles 30a-30n and GNSS satellites 40a-40n implemented may vary according to the design criteria of a particular implementation.

An apparatus 100 is shown installed in each of the vehicles 30a-30n. In the example shown, the apparatus 100a is shown installed in the vehicle 30a and the apparatus 100n is shown installed in the vehicle 30n. The apparatuses 100a-100n may be implemented as a block (or circuit). The circuits 100a-100n may implement an ADAS Horizon system module. In some embodiments, the circuits 100a-100n may be implemented as a circuit installed in the vehicles 30a-30n (e.g., a component built into the vehicle). In some embodiments, the circuits 100a-100n may be implemented as an externally added circuit (e.g., an after-market part, a dash-mounted device, etc.). In some embodiments, the circuits 100a-100n may be implemented as a hand-held (mobile) device that may be transferred from vehicle to vehicle by a user (e.g., a smart phone, a tablet computing device, a smart watch, etc.). In an example, the mobile device may enable the circuits 100a-100n to be used as a retrofit for a vehicle. The implementation of the circuits 100a-100n 100n may be varied according to the design criteria of a particular implementation.

In some embodiments, the circuits 100a-100n may be configured to receive communications from the GNSS satellites 40a-40n. 40n. In some embodiments, other components of the vehicles 30a-30n may be configured to receive communications from the GNSS satellites 40a-40n. Generally, the satellites 40a-40n may communicate signals. One or more of the circuits 100a-100n and/or other components of the vehicles 30a-30n may be configured to receive the signals from the GNSS satellites and perform calculations based on the signals to determine location and velocity data about the vehicles 30a-30n. In an example, the location and velocity data (e.g., a vector) may comprise a location, a heading and/or speed.

As the number of vehicles with Vehicle to Vehicle and/or Vehicle to Infrastructure systems (V2X) increases, vector only solutions may generate potential false positives in certain cases. For example, road geometry alone may not allow accurate collision detection and may trigger false positives. The circuits 100a-100n may be configured to use map information to reduce false positives and/or determine a probability of a collision with another vehicle. In an example, the map information may be information from ADAS Horizon. The map information may comprise data corresponding to the roadways near the vehicle 30 (e.g., road layout, road shape, traffic data, road condition information, road attributes, road incline, road decline, road elevation, etc.). The type of data in the map information may be varied according to the design criteria of a particular implementation.

GNSS positional information calculated from the signals from the GNSS satellites 40a-40n may be implemented in the ADAS Horizon system module 100 (to be described in more detail in connection with FIG. 6) to allow the determination of a Most Probable Path (MPP) of a first (or transmitting) vehicle (e.g., the car 30a). The MPP may be transmitted along with location, heading and/or speed information. The system (e.g., the module 100n) in a second (or receiving) vehicle (e.g., the car 30n) may use knowledge of the received MPP from the first vehicle (e.g., the vehicle 30a) and an MPP calculated corresponding to the receiving vehicle (e.g., the car 30n)) to calculate an amount of risk (e.g., a probability of a collision). The MPP information may be used to reduce false positives when location and velocity data (e.g., location, heading and speed vectors) indicate a collision may occur, but road geometry will not permit the a likely collision. Similarly, in some scenarios, despite the vector solution indicating no collision, the calculations based on the MPPs may indicate that the paths will merge for a possible collision.

In another scenario, even with excellent GNSS reception and/or ADAS maps, lane level position is not always available and/or practical. Augmenting V2X and/or Horizon systems with sensor-based information (e.g., vision) may provide lane level resolution and/or may be used to mitigate false positives and/or false negatives in passing lane scenarios. By combining V2X and/or Horizon systems with vision, a significant improvement to the utility of each of the systems may be realized. A high level of system integrity may result. Generally, a V2X system transmits position, heading and/or speed over ground. From this, the circuits 100a-100n may implement V2X MPP determinations to look for collision warnings.

ADAS Horizon may comprise a feature map. Information about various roads with regard to curvature, slope, lanes, speed limit, signage, etc. may be available. The horizon algorithms use heading, location and/or speed from the GNSS sensor (e.g., implemented on the circuits 100a-100n and/or other components of the vehicles 30a-30n) to know where a particular vehicle is. The map features may be used in the calculation of the Most Probable Path (MPP) that a particular vehicle will take. Extracting information from the feature map may allow the system to be aware of upcoming intersections, over passes, traffic lights, etc.

Figure 2:
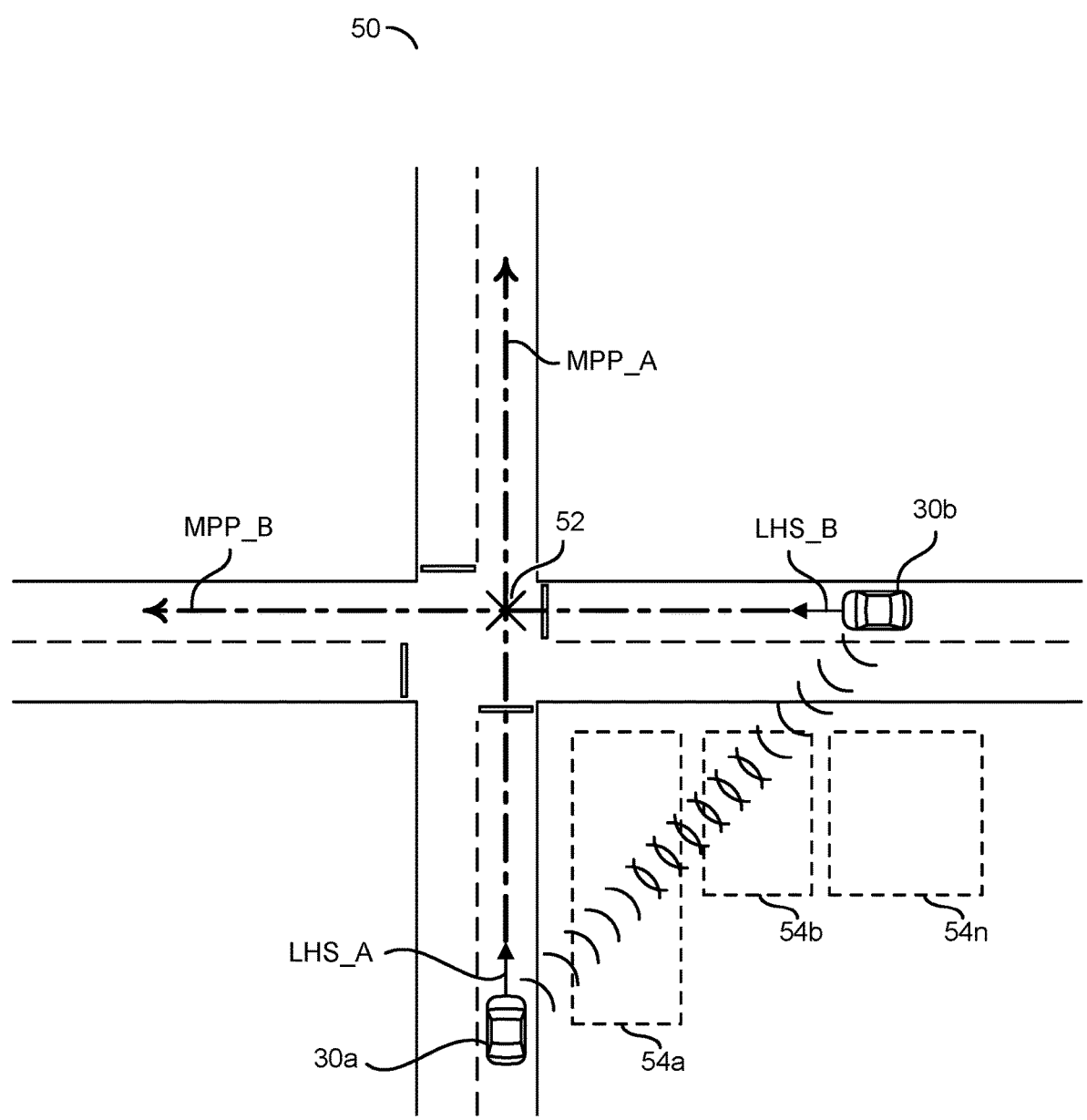
FIG. 2 is a diagram of two vehicles approaching an intersection illustrating a collision warning.

Referring to FIG. 2, a block diagram of an overhead view 50 is shown in accordance with an embodiment of the invention. The view 50 shows an example of the implementation of V2X in a V2V application. Two vehicles 30a-30b are shown approaching an intersection. The vehicle 30a may calculate and/or transmit a signal (e.g., LHS_A). The signal LHS_A may represent one or more of location information, heading information and/or speed information (e.g., the location and velocity information of the vehicle 30a). The signal LHS_A may be represented in a map as a straight vector. The vehicle 30a may also calculate and/or transmit a signal (e.g., MPP_A). The signal MPP_A may represent a most probable path of the vehicle 30a. The signal MPP_A may be represented in a map as a straight path or a possibly curved path (e.g., a path that follows a geometry of the road). Similarly, the vehicle 30b may calculate and/or transmit a signal (e.g., LHS_B). The signal LHS_B may represent one or more of location information, heading information and/or speed information (e.g., the location and velocity information of the vehicle 30b). The vehicle 30b may also calculate and/or transmit a signal (e.g., MPP_B). The signal MPP_B may represent a most probable path of the vehicle 30b.

The signal MPP_A and/or the signal MPP_B may be represented as an image of a directional arrow when shown on an electronic map. The signal MPP_A and/or MPP_B may also be data sent from one or more of the vehicles 30a-30n. The signal MPP_A and/or the signal MPP_B may define a path of a probable movement of the vehicle 30a and/or the vehicle 30b. The signal LHS_A and/or the signal LHS_B generally represent the current direction of the vehicle 30a or the vehicle 30b. The signal LHS_A and/or the signal LHS_B in general do not contemplate a future (or predicted) direction of the vehicle 30a and/or the vehicle 30b. The signal MPP_A and/or the signal MPP_B generally represent a predicted probable path (e.g., a future direction and/or location) of the vehicle 30a and/or the vehicle 30b. The predicted path in the signal MPP_A and/or MPP_B may be based on known road conditions (e.g., upcoming intersections, overpasses, traffic lights, etc.) that may be received from a navigation system, or other external database.

The signal MPP_A and/or MPP_B may be calculated by one or more of the circuits 100a-100n. In some embodiments, the circuit 100a installed in the vehicle 30a may calculate the vector LHS_A (e.g., based on signals received from the satellites 40a-40n) and/or the signal MPP_A (e.g., determine the location and velocity information and path information for the vehicle 30a). The circuit 100b or another component installed in the vehicle 30b may calculate the vector LHS_B (e.g., based on the signals received from the satellites 40a-40n) and transmit the signal LHS_B to the vehicle 30a. Using the information from the signal LHS_B and the map information, the circuit 100a may calculate the signal MPP_B (e.g., one of the vehicles calculates the signal MPP_A and the signal MPP_B). In some embodiments, the circuit 100b may calculate the signal MPP_B and the vehicle 30a (or the circuit 100a) may receive the signal MPP_B (e.g., each vehicle calculates a respective signal MPP and communicates the most probable path to other vehicles).

In the example view 50, the signal LHS_B is shown having a similar direction as the signal MPP_B. Since the road is shown as a generally straight road, the signal MPP_B is also generally straight. However, other examples of road conditions may show differences between the location and velocity data (e.g., the signals LHS_A and LHS_B) and the path data (e.g., the signals MPP_A and MPP_B) (the examples shown in connection with FIG. 3, FIG. 4, FIG. 5 and FIG. 6).

One or more buildings 54a-54n on a roadside may prevent other systems (e.g., vision and/or radar) from detecting other vehicles. For example, the buildings 54a-54n are shown blocking a line of sight between the vehicle 30a and the vehicle 30b. Transmission of the position, heading and/or speed LHS_A and/or LHS_B may be over ground (e.g., through a wireless transmission such as a 5.9 GHz compatible transmission system). Transmission through a wireless spectrum may allow the circuits 100a-100n to detect a potential collision and provide a warning and/or take appropriate action when a line of sight is not possible and/or practical. In some embodiments, the buildings (or other structures such as cellular towers) 54a-54n may be the infrastructure enabling vehicle to infrastructure (V2I) communication.

An intersection point 52 is shown marking the cross between the path MPP_A and the path MPP_B. The intersection 52 is within a known road, or intersection, and illustrates a scenario where a positive collision warning is appropriate. The scenario shown in the overhead view 50 may represent a simple intersection situation where the vector information (e.g., LHS_A and LHS_B) may be used to predict a collision at the intersection 52 and the path data (e.g., MPP_A and MPP_B) may be used to predict a collision at the intersection 52.

Figure 3:
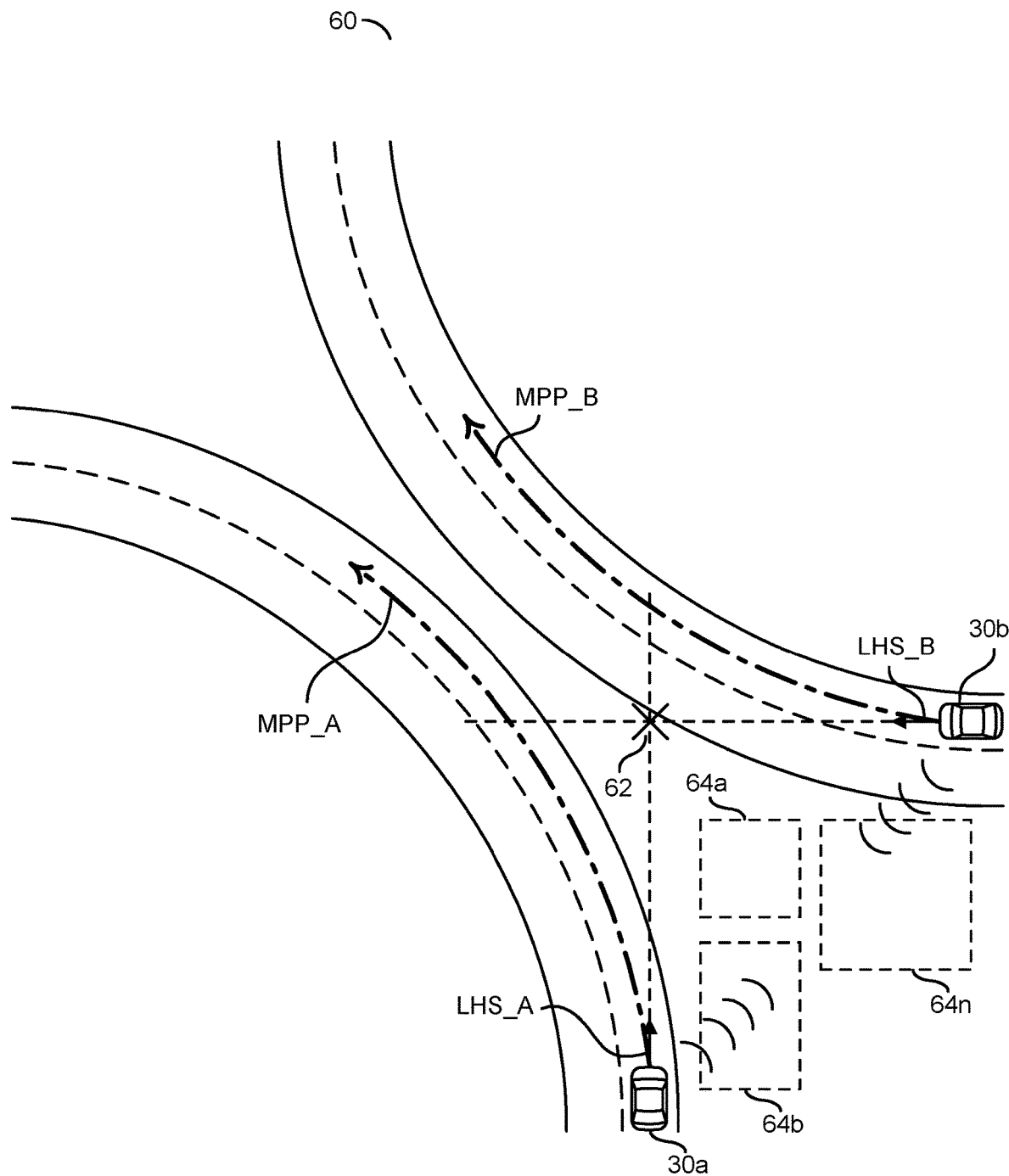
FIG. 3 is a diagram of two vehicles illustrating a potential false positive.

Referring to FIG. 3, a diagram of an overhead view 60 shows the vehicle 30a and the vehicle 30b traveling on two separate roads curving away from each other. The view 60 illustrates the prevention of a potential false positive warning that would occur using only the vector analysis (e.g., the signals LHS_A and LHS_B).

The positions of the vehicle 30a and/or the vehicle 30b are shown on a curved road. The vectors LHS_A and/or LHS_B show that the vehicle 30a and/or the vehicle 30b are headed for a collision at an intersection point 62. However, the path data MPP_A and MPP_B are shown diverging (e.g., due to the roads curving away from each other). The intersection point 62 is shown at a location that is not on a road. The vectors LHS_A and LHS_B may not have knowledge of the roads. The path data MPP_A and/or MPP_B may be calculated based on knowledge of the curve of the roads (e.g., map information). If the potential false positive is not corrected, an improper collision warning may be issued and/or an erroneous corrective action may result. The system 60 shows how a potential false positive is avoided by analyzing the path data MPP_A and/or the path data MPP_B. The scenario shown in the overhead view 60 may represent a situation where the vector information (e.g., LHS_A and LHS_B) may not be useful to predict a collision at the intersection point 62 (e.g., a false positive may occur) and the path data (e.g., MPP_A and MPP_B) may be used to predict a collision will not occur at the intersection point 62.

Figure 4:
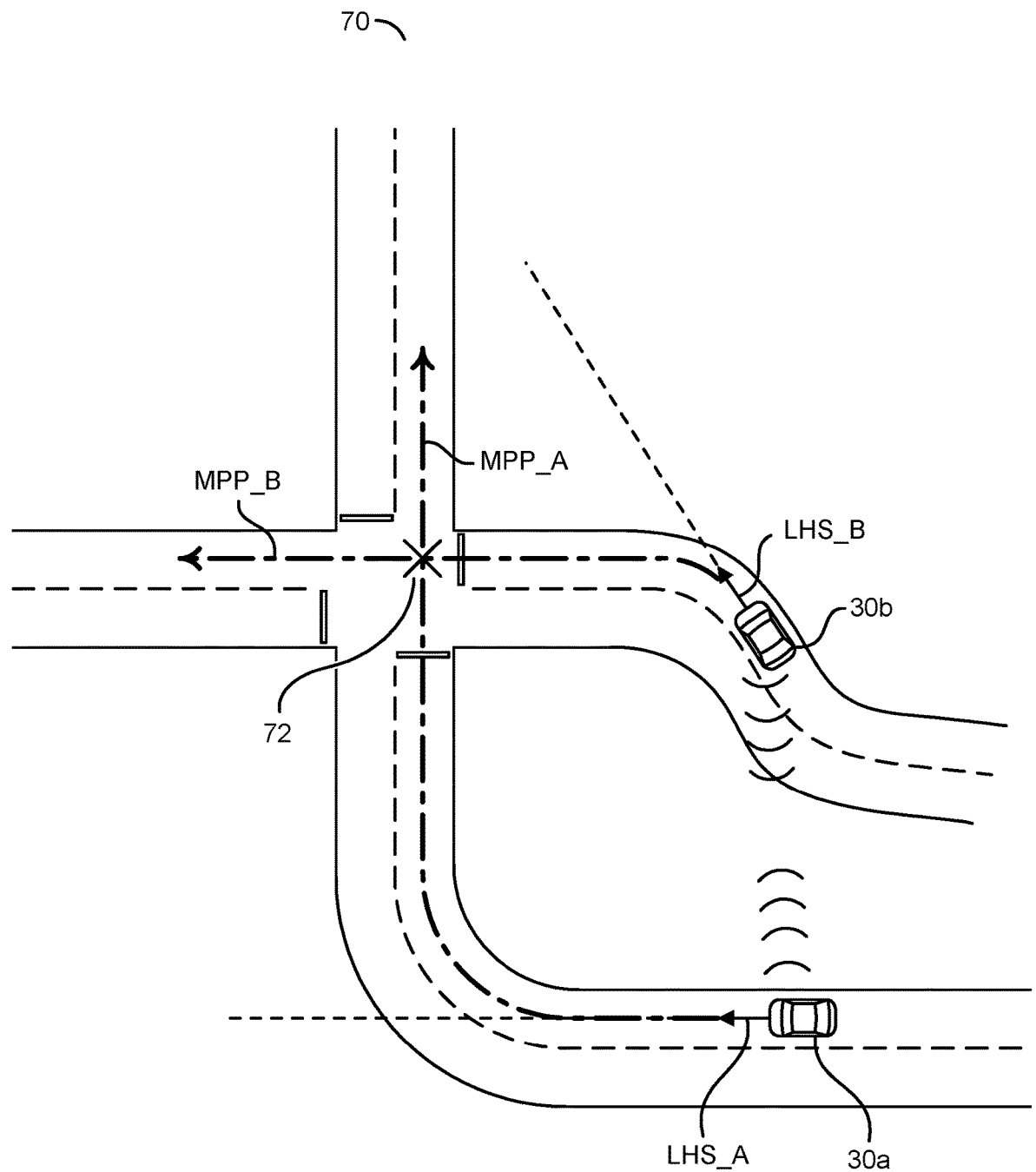
FIG. 4 is a diagram of two vehicles illustrating a possible collision.

Referring to FIG. 4, a diagram of an overhead view 70 shows two vehicles in a possible collision scenario on curved roads that intersect. The vehicle 30a and the vehicle 30b are shown traveling on roads that curve towards each other. The view 70 shows how the vectors LHS_A and LHS_B diverge as a result of the curve of the roads. A calculation to determine a possible collision between the vehicle 30a and the vehicle 30b using only the vectors LHS_A and LHS_B may indicate that a probability of collision is low.

Using the map information, the circuits 100a-100n may calculate the path data (e.g., MPP_A and MPP_B). Based on the curvature of the roads, the path data MPP_A and/or MPP_B may be used to detect an intersection at the intersection point 72. The vehicle 30a and the vehicle 30b are on generally parallel (or divergent) separate routes that eventually intersect. A calculation without the path data MPP_A and/or MPP_B may not detect a collision warning. However, with the path data MPP_A and/or MPP_B calculated based on road conditions, a potential collision may be predicted at the intersection point 72.

Without considering the path data MPP_A and/or MPP_B, the vehicle 30a and the vehicle 30b may be determined to not intersect (e.g., a potential collision will not be detected) until there is not sufficient time to initiate an appropriate warning and/or reaction. The scenario shown in the overhead view 70 may represent a situation where the vector information (e.g., LHS_A and LHS_B) may not be useful to predict a collision (e.g., a potential false negative result) at the intersection point 72 and the path data (e.g., MPP_A and MPP_B) may be used to predict a collision may occur at the intersection point 72.

Figure 5:
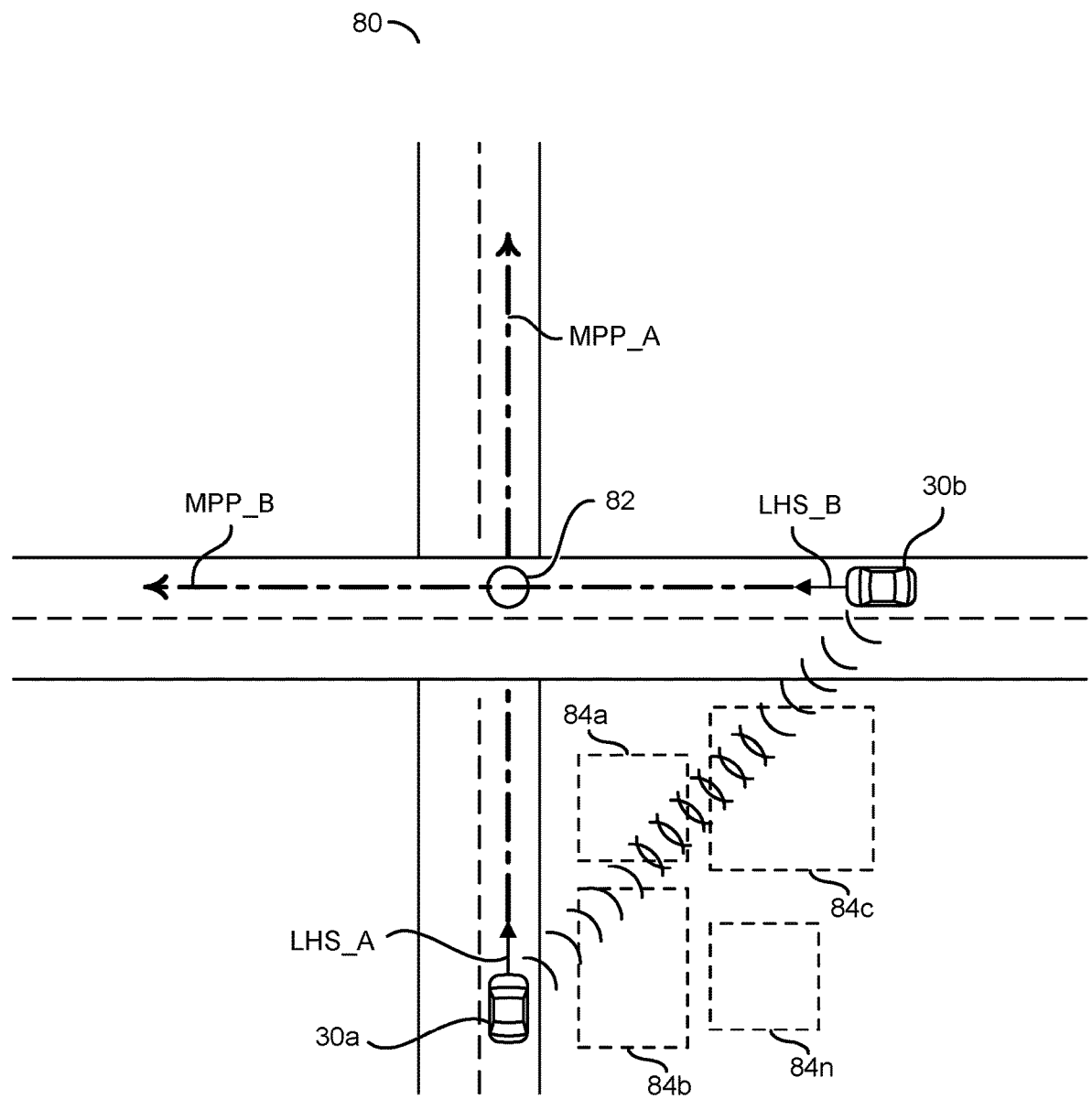
FIG. 5 is a diagram of two vehicles illustrating a possible false positive in the context of an overpass.

Referring to FIG. 5, a diagram of an overhead view 80 of the vehicle 30a and the vehicle 30b in a context of an overpass is shown. The view 80 illustrates the prevention of a false positive in the context of an overpass. Without taking into account attributes of the roads (e.g., elevation), a false positive for a collision may occur at an intersection point 82.

An analysis of only the vector LHS_A and the vector LHS_B indicates a collision and/or warning at the intersection point 82. However, analysis of the path data MPP_A compared with the path data MPP_B in connection with available map information recognizes an overpass at the intersection point 82. For example, the map information may take into account an elevation of the roadways and/or the vehicles 30a-30b. The map information is used to determine that vehicle 30b should pass above vehicle 30a. A false positive may be avoided. The scenario shown in the overhead view 80 may represent a situation where the vector information (e.g., LHS_A and LHS_B) may not be useful to predict a collision at the intersection point 82 (e.g., a false positive may occur) and the path data (e.g., MPP_A and MPP_B) may be used to predict a collision will not occur at the intersection point 82 (e.g., by taking into account a relative elevation).

Figure 6:
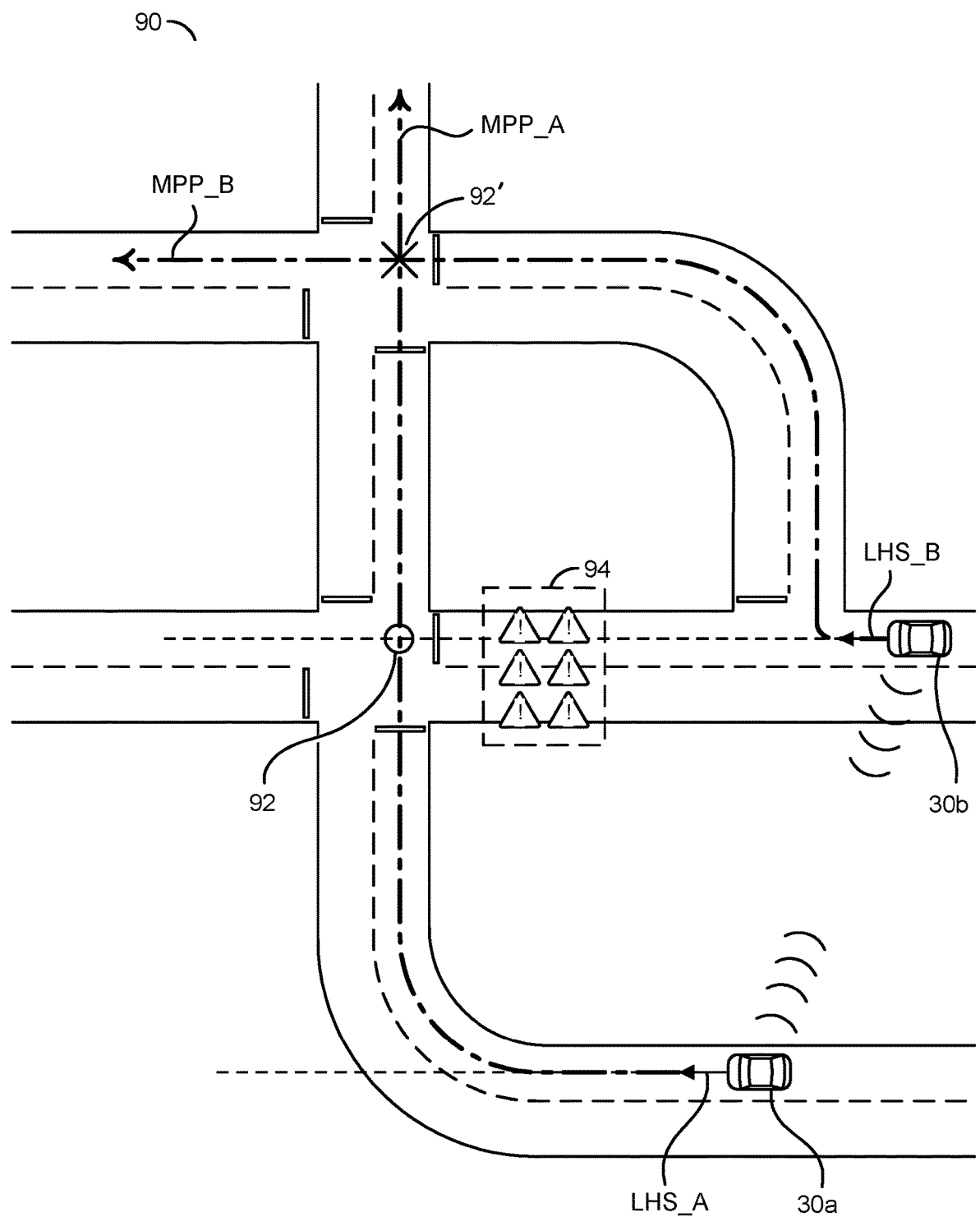
FIG. 6 is a diagram of two vehicles illustrating a possible false collision based on road attributes.

Referring to FIG. 6, a diagram illustrating an overhead view 90 of two vehicles in the context of a possible false collision detection based on road attributes. The view 90 illustrates the vehicle 30a traveling along a road in generally the same direction as the vehicle 30b. In the example shown, the vector LHS_A and the vector LHS_B point in generally the same direction. An analysis using only the location and velocity information may not detect a potential collision. Using the map information MPP_A, the apparatus 100a may determine that the road curves and there are potential collisions at the intersection point 92 and/or the intersection point 92'.

The map information may further take into account road attributes. Road attributes 94 are shown in the view 90. In an example, the road attributes 94 may be traffic signals (e.g., traffic lights, road signs, speed limits, etc.). In another example, the road attributes 94 may be a road hazard and/or warning (e.g., construction, a traffic accident, poor weather conditions, etc.). In still another example, the road attributes 94 may be traffic conditions (e.g., a traffic jam, a police patrol vehicle, emergency vehicles, etc.). The type of the road attributes 94 and/or how the road attributes 94 affect the determination of the MPP may be varied according to the design criteria of a particular implementation.

The signal MPP_B may indicate that the vehicle 30b may avoid a path straight ahead due to the road attributes 94 and take an alternate route. The apparatus 100a and/or 100b may determine that the probability of a collision at the intersection point 92 may be unlikely. However, the alternate path of the signal MPP_B is shown intersecting with the signal MPP_A at the intersection point 92'. The apparatus 100a and/or the apparatus 100b may determine a higher probability of collision at the intersection point 92'. The scenario shown in the overhead view 90 may represent a situation where the vector information (e.g., LHS_A and LHS_B) may not be useful to predict a collision at the intersection point 92 and/or the intersection point 92' and the path data (e.g., MPP_A and MPP_B) may be used to predict a collision will not occur at the intersection point 92 and a collision may occur at the intersection point 92' (e.g., by taking into account the road attributes 94 and/or evaluating multiple potential routes taken by the vehicle 30b).

Figure 7:
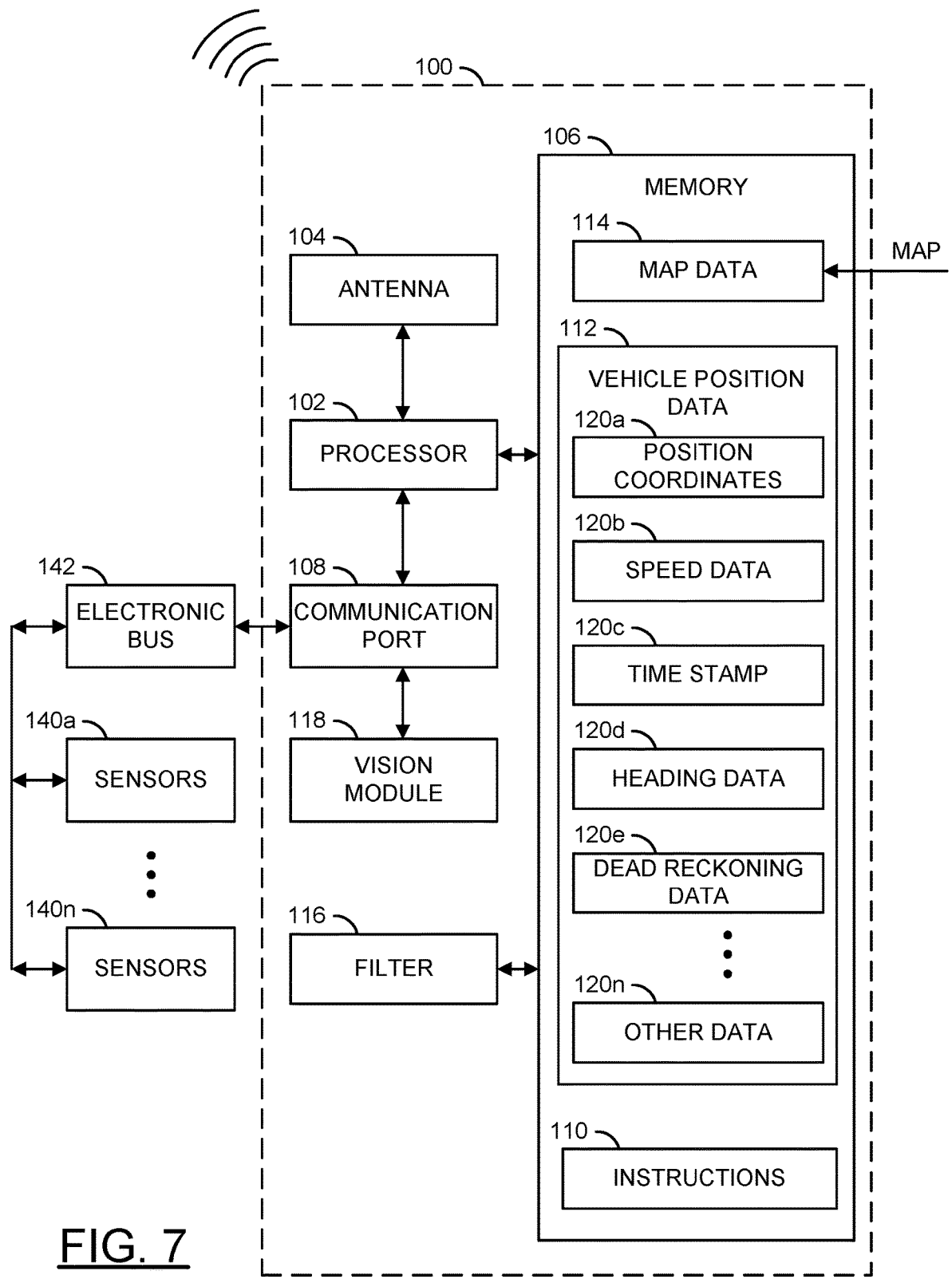
FIG. 7 is a diagram illustrating a module.

Referring to FIG. 7, a diagram illustrating the module 100 is shown. The module 100 generally comprises a block (or circuit) 102, a block (or circuit) 104, a block (or circuit) 106 and/or a block (or circuit) 108. The circuit 102 may implement a processor. The circuit 104 may implement an antenna. The circuit 106 may implement a memory. The circuit 108 may implement a communication port. Other blocks (or circuits) may be implemented (e.g., a clock circuit, I/O ports, power connectors, etc.). For example, a block (or circuit) 116 is shown implementing a filter. In another example, a block (or circuit) 118 is shown implementing a vision module.

Sensors 140a-140n are shown connected to the module 100 via an electronic bus 142. The electronic bus 142 may implement a Controller Area Network (CAN) bus. The electronic bus 142 may connect to the communication port 108. In an example, the sensors 140a-140n may be components of the vehicle 30 configured to provide data to a vehicle CAN bus. In another example, the sensors 140a-140n may be wireless devices configured to provide data to the apparatus 100.

The processor 102 may be implemented as a microcontroller and/or a GNSS chipset. In some embodiments, the processor 102 may be a combined (e.g., integrated) chipset implementing processing functionality and the GNSS chipset. In some embodiments, the processor 102 may be comprised of two separate circuits (e.g., the microcontroller and the GNSS chipset). In an example, an off-board circuit (e.g., a component that is not part of the module 100) may perform the functions of the GNSS chipset and send information to the module 100 (e.g., via the bus 142). In another example, an off-board circuit (e.g., a component that is not part of the module 100) may perform functions for determining location (e.g., dead reckoning data), velocity and/or map data and send information to the module 100 (e.g., via the bus 142). The design of the processor 102 and/or the functionality of various components of the processor 102 may be varied according to the design criteria of a particular implementation.

The antenna 104 may be implemented as a dual band antenna capable of connecting to both a cellular network and/or a GNSS network (e.g., the satellites 40a-40n). In another example, the antenna 104 may be implemented as two antennas. For example, one antenna may be specifically designed to connect to the cellular network (or a V2V network), while another antenna may be implemented as being optimized to connect to the GNSS network satellites 40a-40n. The antenna 104 may be implemented as discrete antenna modules and/or a dual band antenna module. In some embodiments, the antenna 104 may be implemented as an off-board circuit (e.g., a component that is not part of the module 100). For example, the antenna 104 may send/receive data to/from the module 100 via the electronic bus 142. The implementation of the antenna 104 may be varied according to the design criteria of a particular implementation.

The memory 106 may comprise a block (or circuit) 110, a block (or circuit) 112 and a block (or circuit) 114. The block 110 may store computer readable instructions (e.g., instructions readable by the processor 102). The block 112 may store vehicle position data. For example, the vehicle position data 112 may store various data sets 120a-120n. Examples of the data sets may be position coordinates 120a, speed data 120b, a time stamp 120c, heading data 120d, dead reckoning data 120e and/or other data 120n. The block 114 may store map data. In an example, the map data 114 may be received from an external source (e.g., a third-party proprietary map network, a free map network, information from other vehicles, etc.). The map data 114 is shown receiving map information from a signal (e.g., MAP).

The position coordinates 120a may store location information data calculated by the module 100 from the signals presented by the GNSS satellites 40a-40n. The signals from the GNSS satellites 40a-40n may provide data from which a particular resolution of location information positional accuracy may be calculated. In some embodiments, the position coordinates 120a may not provide sufficient positional accuracy for particular applications (e.g., lane detection, autonomous driving, etc.). In an example, a vision system (e.g., the vision module 118) using video data captured by one or more cameras (e.g., one or more of the sensors 140a-140n) may be used to improve the accuracy of the position coordinates 120a. In some embodiments, the position coordinates 120a may be calculated by the filter 116. The position coordinates 120a (e.g., location) may be a component of the location and velocity information (e.g., the location, heading and speed provided in the signal LHS).

The speed data 120b may comprise one or more values indicating a speed of the vehicle 30. In an example, the speed data 120b may be calculated by the processor 102 based on the position coordinates 120a (e.g., a change in position over a particular amount of time). In another example, the speed data 120b may be determined based on data captured by the sensors 140a-140n. In some embodiments, the speed data 120b may comprise multiple values to provide a history of the speed of the vehicle 30. In an example, prior values in the speed data 120b may be used to predict a probable speed when determining the path data (e.g., MPP). For example, a driver that generally drives faster may reach an intersection earlier than another driver that has a tendency to drive slower. The speed data 120b (e.g., speed) may be a component of the location and velocity information (e.g., the location, heading and speed provided in the signal LHS).

The time stamp 120c may be used to determine an age of the vehicle position data 112. For example, the time stamp 120c may be used to determine if the vehicle position data 112 should be considered reliable or unreliable. The time stamp 120c may be updated when the module 100 updates the vehicle position data 112. For example, the time stamp 120c may record a time in Coordinated Universal Time (UTC) and/or in a local time. In an example, the time stamp 120c may be used to store a history of the speed data 120b.

The implementation of the time stamp 120c may be varied according to the design criteria of a particular implementation.

The heading data 120d may comprise one or more values indicating a direction of travel of the vehicle 30. In an example, the heading data 120d may be calculated by the processor 102 based on the position coordinates 120a. In another example, the heading data 120d may be determined based on data from the sensors 140a-140n. In some embodiments, the heading data 120d may comprise multiple values to provide a history of the heading of the vehicle 30. In an example, prior values in the heading data 120d may be used to predict a probable route of travel when determining the path data (e.g., MPP). For example, a driver that generally drives using particular routes may repeat traveling the route when traveling in a particular area (e.g., a driver taking the same route to work each weekday). The heading data 120d (e.g., heading) may be a component of the location and velocity information (e.g., the location, heading and speed provided in the signal LHS).

The dead reckoning data 120e may be used to store past and/or present information to determine positions traveled by the vehicle 30. For example, the dead reckoning data 120e may store a previously determined position of the vehicle 30 (e.g., estimated speed, estimated time of travel, estimated location, etc.). The previously determined position may be used to help determine a current position of the vehicle 30. In some embodiments, the dead reckoning data 120e may be determined based on data from the sensors 140a-140n of the vehicle 30 (e.g., an on-board gyroscope and/or wheel click messages). The dead reckoning data 120e may be used to provide more accurate information for the position coordinates 120a (e.g., location) component of the location and velocity information (e.g., the location, heading and speed provided in the signal LHS). The implementation and/or the information stored to determine the dead reckoning data 120e may be varied according to the design criteria of a particular implementation.

The communication port 108 may allow the module 100 to communicate with external devices and/or the sensors 140a-140n. For example, the module 100 is shown connected to the external electronic bus 142. In some embodiments, the electronic bus 142 may be implemented as a vehicle CAN bus. The electronic bus 142 may be implemented as an electronic wired network and/or a wireless network (e.g., the wireless connection 142a). Generally, the electronic bus 142 may connect one or more component of the vehicle enabling a sharing of information in the form of digital signals (e.g., a serial bus, an electronic bus connected by wiring and/or interfaces, a wireless interface, etc.).

The communication port 108 may allow the module 100 to share the vehicle position data 112 with various infrastructure, components of the transmitting vehicle (e.g., the vehicle 30a) and/or other vehicles (e.g., the vehicle 30b). The communication port 108 may allow the module 100 to receive information from the sensors 140a-140n of the vehicle (e.g., the on-board gyroscope data and/or wheel click messages used to determine the speed data 120b, the heading data 120d and/or the dead reckoning data 120e). For example, information from the module 100 may be communicated to an information device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The module 100 may be configured to calculate location and velocity data and/or path data and/or broadcast data (e.g., via the communication port 108) such as the positional coordinates 120a, an age of the data (e.g., when the data was last updated such as the time stamp 120c), the speed data 120b, the heading data 120d and/or other data 120n. A method of communication by the communication port 108 and/or the type of data transmitted may be varied according to the design criteria of a particular implementation.

The map data 114 may provide a feature map. In some embodiments, the map data 114 may provide centerline data for various roadways. In some embodiments, the map data 114 may provide a high definition map (e.g., provide lane level positioning). In some embodiments, the map data 114 may be ADAS horizon information. The map data 114 may be used to identify intersecting roads and non-intersecting roads. The map data 114 may be used to determine an elevation (or relative elevation) of roads. The map data 114 may identify a location of traffic signals and/or traffic signs. The map data 114 may provide crowd-sourced information (e.g., traffic conditions, accident reports, road hazards, etc.). The map data 114 may provide the road attributes 94. The type of data stored as the map data 114 may be varied according to design criteria of a particular implementation.

The filter 116 may be configured to perform a linear quadratic estimation. For example, the filter 116 may implement a Kalman filter. Generally, the filter 116 may operate recursively on input data to produce a statistically optimal estimate. For example, the filter 116 may be used to calculate the position coordinates 120a and/or estimate the accuracy of the position coordinates 120a. In some embodiments, the filter 116 may be implemented as a separate module. In some embodiments, the filter 116 may be implemented as part of the memory 106 (e.g., the stored instructions 110). The implementation of the filter 116 may be varied according to the design criteria of a particular implementation.

The vision module 118 may implement one or more components for implementing computer vision (e.g., image and/or object detection and analysis based on captured video data). In an example, the vision module 118 may comprise a video processor and/or memory. In some embodiments, one or more of the sensors 140a-140n may implement a video capture device (e.g., a high-definition camera) for providing video data to the vision module 118. The vision module 118 may process, encode, and/or analyze captured video frames. Based on the analysis of the video frames, the vision module 118 may provide additional information to the processor 102 to determine a probability of a collision. In an example, the video analysis by the vision module 118 may provide additional information to determine a most probable path of the vehicle 30.

The processor 102 may be configured to execute stored computer readable instructions (e.g., the instructions 110 stored in the memory 106). The processor 102 may perform one or more steps based on the stored instructions 110. In an example, the processor 102 may calculate the location and velocity information (e.g., based on the signals received from the GNSS satellites). In another example, one of the steps executed/performed by the processor 102 may determine the predicted path (e.g., the MPP) based on the map data 114. The instructions executed and/or the order of the instructions performed by the processor 102 may be varied according to the design criteria of a particular implementation. The processor 102 is shown sending data to and/or receiving data from the antenna 104, the memory 106 and/or the communication port 108.

The processor 102 may be configured to determine coefficients (e.g., parameters) for calibrating signals generated by the sensors 140a-140n. For example, the processor 102 may be configured to compare dead reckoning data based on data from the sensors 140a-140n with position coordinates calculated from the GNSS satellite signals. Based on the comparison, the processor 102 may determine coefficients to transform (e.g., offset) raw data received from the sensors 140a-140n into data that may be used to determine a position with greater accuracy than using the data without being transformed by the coefficients.

The module 100 may be configured as a chipset, a system on chip (SoC) and/or a discrete device. In some embodiments, the module 100 may comprise a GNSS chipset and be configured to calculate a location, heading and speed (LHS) solution. In some embodiments, the module 100 may comprise a GNSS chipset and be configured to calculate the LHS solution and the dead reckoning solution. In some embodiments, the module 100 may be configured to receive a data stream that provides the LHS solution and may not determine the dead reckoning solution (e.g., the module 100 receives LHS data from an off-board component and provides an off-board component to determine the dead reckoning solution). In some embodiments, the module 100 may be configured to receive a data stream that provides the LHS solution and be configured to calculate the dead reckoning solution.

The processor 102 may be configured to determine the most probable path from the map data 114 and/or the LHS solution. In some embodiments, the module 100 may calculate the most probable path solution (e.g., MPP). In some embodiments, the module 100 may receive the most probable path solution from an off-board component. In some embodiments, the module 100 may receive the most probable path calculated from another vehicle. In some embodiments, the module 100 may calculate the most probable path solution and send the signal MPP_A to another vehicle (e.g., 30b). In some embodiments, the module may transmit the LHS solution to the vehicle 30b and the module 100b may calculate the most probable path of the vehicle 30a and the most probable path of the vehicle 30b. For example, some vehicles may not have one of the modules 100a-100n installed but may still be capable of transmitting the LHS solution from which the module 100 may calculate the most probable path for the vehicle.

In some embodiments, the module 100 may use an external processor (e.g., an off-board processor) to perform the calculations to determine the MPP (e.g., the memory 106 provides the instructions 110 to the external processor to calculate the MPP). In some embodiments, the instructions 110 may be stored on an external memory. The implementation of the module 100 may be varied according to the design criteria of a particular implementation.

Figure 8:
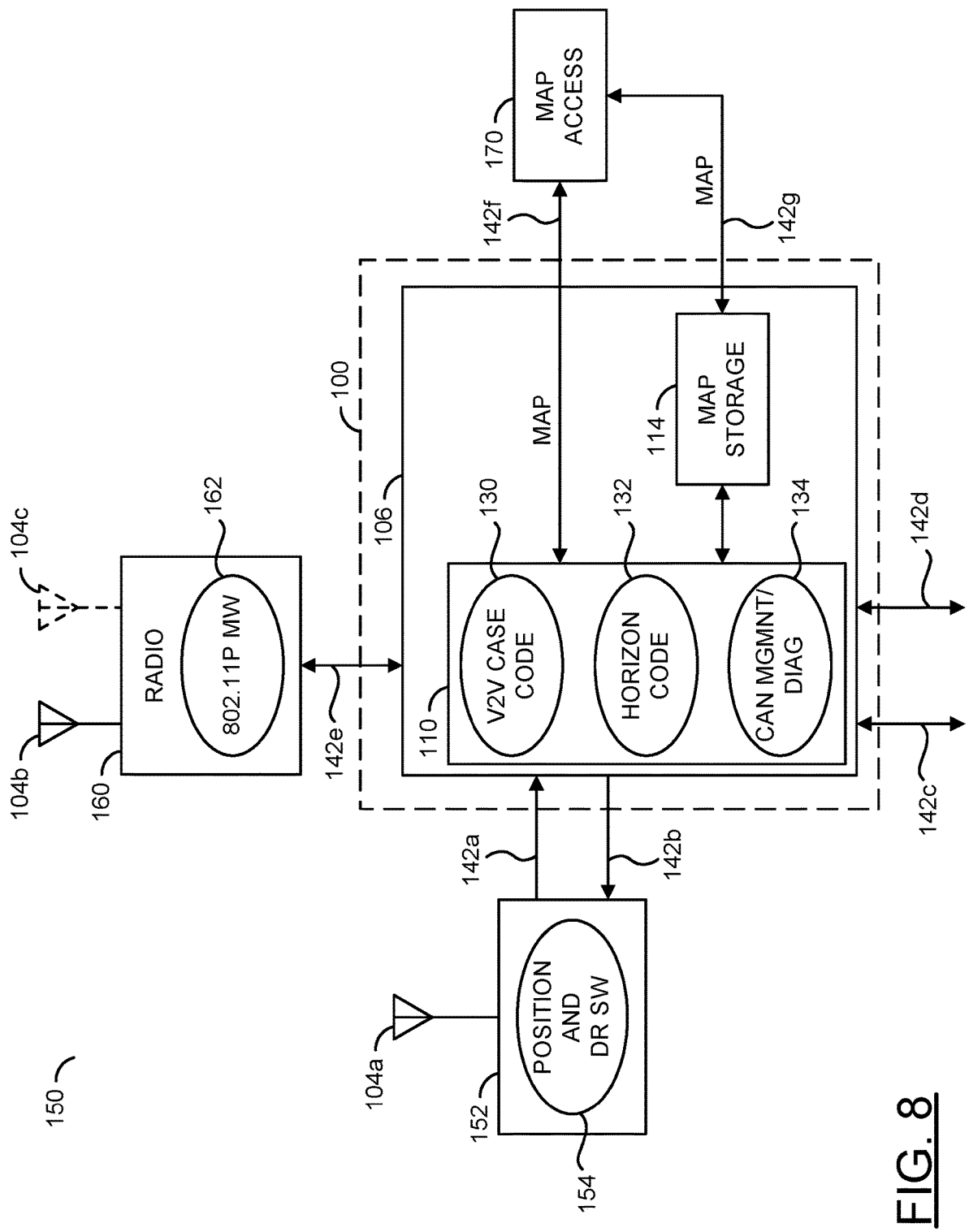
FIG. 8 is a diagram illustrating a distributed arrangement for a module.

Referring to FIG. 8, a diagram illustrating a distributed arrangement 150 for the module 100 is shown. The module 100 is shown connected to various components to send/receive information. A block (or circuit) 152, a block (or circuit) 160 and/or a block (or circuit) 170 is shown connected to the module 100. The circuits 152, 160 and/or 170 may each comprise various components such as a processor and a memory and may operate independently of each other. Other components (not shown) may be connected to the module 100 (e.g., a component comprising the vision module 118).

The instructions 110 of the memory 106 is shown comprising a module 130, a module 132 and a module 134. The module 130 may be a V2V case code. The V2V case code 130 may implement instructions for communicating with other vehicles. The module 132 may be horizon code. The horizon code 132 may implement instructions for determining the path data using the map data. The module 134 may implement CAN management and/or diagnostics code. The CAN management and/or diagnostics code 134 may implement instructions for communicating with the various communication buses 142a-142g. In an example, the bus 142d may implement a high-speed CAN transceiver (e.g., to communicate sensor input, location and velocity data output, path data output, output from the V2V case code module 130, etc.).

The circuit 152 may be a position module. The position module 152 may be configured to calculate a position of the vehicle 30. In an example, the position module 152 may be a GNSS module. The position module 152 may receive communication from the GNSS satellites 40a-40n using the antenna 104a. The position module 152 may be a component separate from the module 100. In an example, the position module 152 may communicate location and velocity information with the module 100 via the buses 142a and/or 142b. The position module 152 may comprise a module 154. The module 154 may be position and/or dead reckoning software. The position and/or dead reckoning software 154 may implement instructions for determining the position coordinates 120a, the speed data 120b, the time stamp 120c, the heading data 120d and/or the dead reckoning data 120e.

The module 160 may be a radio communications module. The radio communications module 160 may provide dedicated short-range communications. In an example, the radio communications module 160 may send and/or receive data using the antennas 140b-140c. The radio communications module 160 may be a component separate from the module 100. In an example, the radio communications module 160 may communicate information received from other vehicles (e.g., the signal LHS_B and/or the signal MPP_B from the vehicle 30b). The radio communications module 160 may communicate information with the module 100 via the bus 142e. The radio communications module 160 may comprise a module 162. The module 162 may be a 802.11P MW module. The 802.11P MW module 162 may implement instructions for wireless access in vehicular environments (WAVE). In an example, the 802.11P MW module 160 may implement microwave communications (e.g., operate in the 5.9 GHz band). Other wireless communications standards may be implemented. The communication standard implemented may be varied according to the design criteria of a particular application.

The module 170 may be a map access module. The map access module 170 may store and/or receive map information. In an example, the map access module 170 may be a third-party mapping platform (e.g., Google Maps, Apple Maps, Waze, etc.). In another example, the map access module 170 may be a pre-installed vehicle component storing updateable map information. In some embodiments, where the map access module 170 locally stores map information, the map access module 170 may communicate the map information signal MAP via the bus 142f to the memory 106 for use by the instructions 110 (e.g., the horizon code module 132). In some embodiments, where the map access module 170 streams map information from an external source, the map access module 170 may communicate the map information signal MAP via the bus 142g to the map storage 114. The transmission and/or storage of the map information may be varied according to the design criteria of a particular implementation.

The modules implemented in the distributed arrangement 150 may have various implementations. In some embodiments, each of the modules (e.g., the position module 152, the radio communications module 160 and/or the map access module 170) may be implemented as components of the module 100. In some embodiments, one or more of the modules may be combined. For example, the map access module 170 and the position module 152 may be a single component (e.g., implemented as one circuit board). In some embodiments, additional modules may be implemented (e.g., the position module 152 may calculate the position coordinates 120a and another module may be implemented for calculating the dead reckoning data 120e). In an example, one additional module implemented as a separate component in the distributed arrangement 150 may be the vision module 118.

Figure 9:
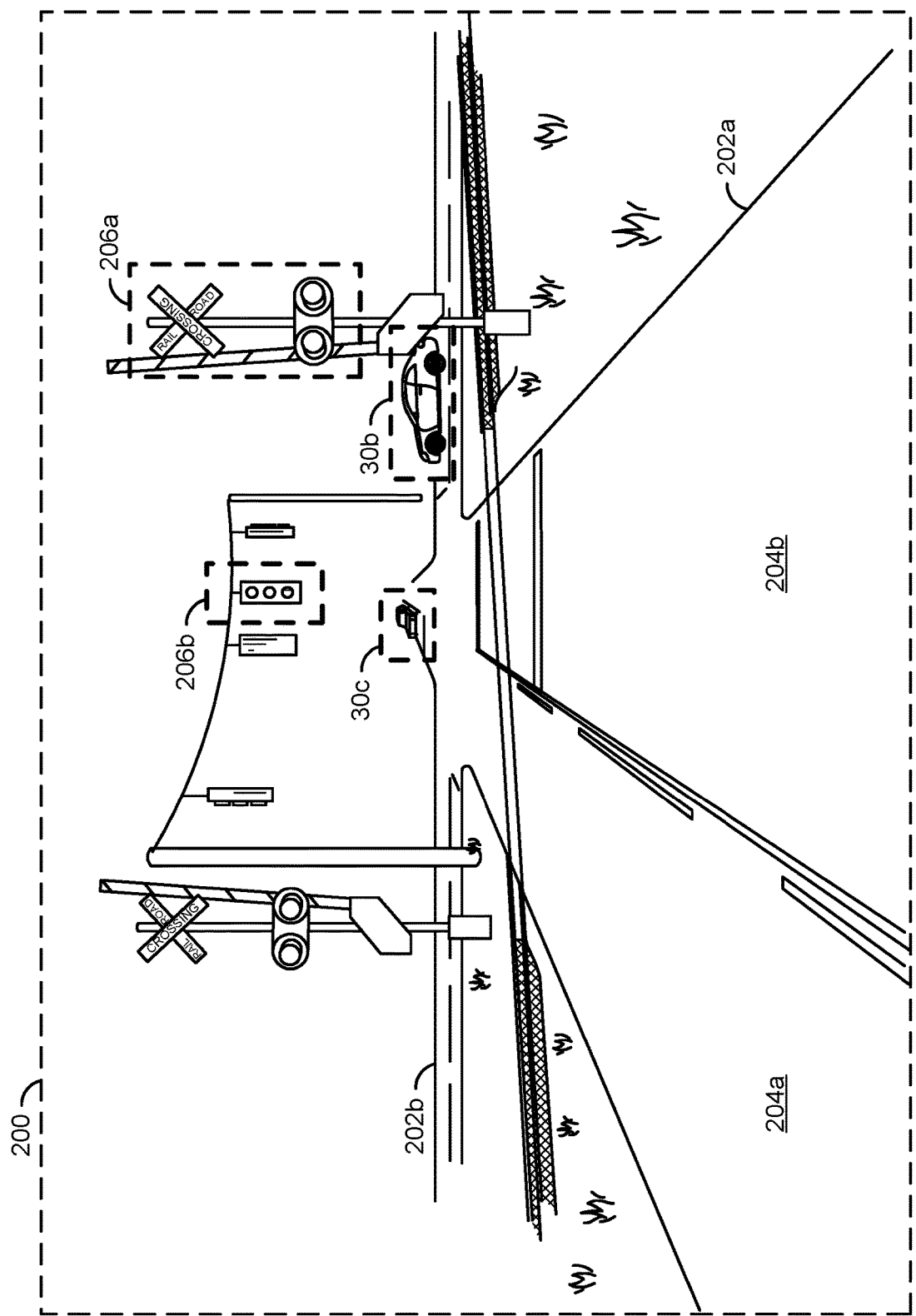
FIG. 9 is a diagram illustrating an example vision system implementation.

Referring to FIG. 9, a diagram illustrating an example vision system implementation is shown. A video frame 200 is shown. The video frame 200 may be a video frame captured by one or more of the sensors 140a-140n and processed by the vision module 118. The vision module 118 may analyze the video frame 200 and identify (recognize) various objects. For example, the objects identified by the vision module 118 may comprise: vehicles, pedestrians, traffic signals, traffic signs, roadways, intersections, lanes, weather conditions and/or other road attributes.

The example video frame 200 may be from the perspective of the vehicle 30a. In the example video frame 200, the vision module 118 may identify the road 202a and the road 202b. The road 202a may be the road the module 100 is traveling (e.g., installed in the vehicle 30a). The vision module 118 and/or the map information may determine that the road 202b may intersect with the road 202a. The vision module 118 may identify the lanes 204a-204b on the road 202a. In the example shown, the module 100 may be traveling in the lane 204b. The vehicle 30c may be detected traveling as oncoming traffic in the lane 204a. The vehicle 30b may be detected by the vision module as traveling on the road 202b and approaching the intersection with the road 202a.

In the example shown, the vision module 118 may detect some objects 206a-206b as the various road attributes 94. A railroad crossing 206a may be one road attribute object. A traffic light 206b may be one road attribute object. The traffic light 206b is shown displaying a green light.

Based on the objects detected by the vision module 118, the module 100 may be provided additional positioning information to determine the probability of a collision. In an example, the vision module 118 may provide lane level positioning. In another example, the vision module 118 may be used to determine a status of traffic lights. For example, the most probable path of the vehicle 30b may be to travel through the intersection along the road 202b.

However, if the vision module 118 detects the traffic light 206b is green towards the road 202a, the most probable path for the vehicle 30b may be to stop before reaching the intersection. In another example, the most probable path of the vehicle 30c may be to travel through the intersection along the road 202a. However, if the railroad crossing 206a indicates a train is approaching, the most probable path of the vehicle 30c may be to stop before reaching the railroad.

The objects detected by the vision module 118 may be used as a replacement and/or enhancement to the map information. For example, the data determined by the vision module 118 may be used to determine the path data. In another example, when the map information provides centerline data, the video analysis by the vision module 118 may provide additional details about the conditions of the road to improve an accuracy of collision detection and/or prediction. In yet another example, the map information may identify that a traffic light is upcoming and the vision module 118 may indicate the color of the traffic light.

Figure 10:
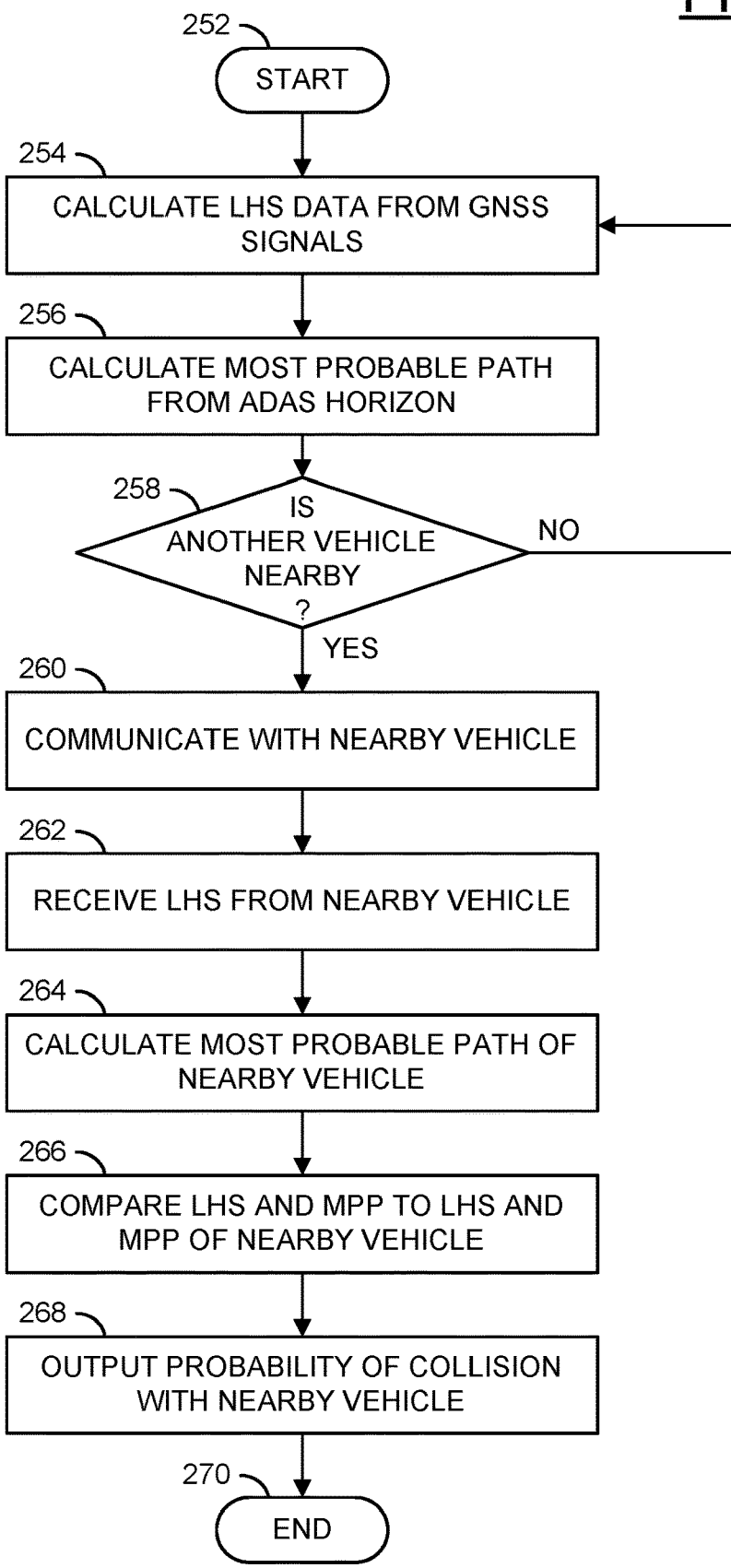
FIG. 10 is a flow diagram illustrating a method for calculating a potential collision.

Referring to FIG. 10, a method (or process) 250 is shown. The method 250 may calculate a potential collision. The method 250 generally comprises a step (or state) 252, a step (or state) 254, a step (or state) 256, a decision step (or state) 258, a step (or state) 260, a step (or state) 262, a step (or state) 264, a step (or state) 266, a step (or state) 268, and a step (or state) 270.

The state 252 may start the method 250. Next, in the state 254, the processor 102 may calculate the location, heading, and speed data (e.g., the location and velocity data) from signals received from the GNSS satellites 40a-40n. In an example, the location may be stored in the position coordinates 120a, the heading may be stored in the heading data 120d and the speed may be stored in the speed data 120b of the memory 106. In some embodiments, the location and velocity data may be determined by calculations from data captured by one or more of the sensors 140a-140n. In the state 256, the processor 102 may calculate the most probable path data (e.g., the path data) from the map data 114 (e.g., ADAS horizon data). Next, the method 250 may move to the decision state 258.

In the decision state 258, the processor 102 may determine whether there is another vehicle nearby (e.g., the vehicle 30b). In an example, the processor 102 may determine another vehicle is nearby based on communications received via the antenna 104. If another vehicle is not nearby, the method 250 may return to the state 254. If another vehicle is nearby, the method 250 may move to the state 260.

In the state 260, the module 100 may communicate with the nearby vehicle (e.g., via the antenna 104). Next, in the state 262, the module 100 may receive the location and velocity data (e.g., the signal LHS_B) from the nearby vehicle 30b. In the state 264, the processor 102 may calculate the most probable path of the nearby vehicle (e.g., the path data MPP_B). For example, the most probable path MPP_B may be calculated for the nearby vehicle 30b using the signal LHS_B and the map data 114. Next, in the state 266, the processor 102 may compare the location and velocity data and the path data corresponding to the module 100 (e.g., the signal LHS_A and the signal MPP_A of the vehicle 30a) to the location and velocity data and the path data corresponding to the nearby vehicle (e.g., the signal LHS_B and the signal MPP_B of the vehicle 30b) to determine a probability of a collision.

In the state 268, the module 100 may output the probability of a collision with the nearby vehicle 30. In an example, the probability of a collision may be transmitted to the CAN bus (e.g., the bus 142). One or more components of the vehicle 30a may use the probability of collision to perform a response (e.g., collision avoidance, braking, speeding up, lane centering, selecting an alternate path of travel, initiating a warning to a driver, automatically performing a maneuver, etc.). Next, the method 250 may move to the state 270. The state 270 may end the method 250.

Figure 11:
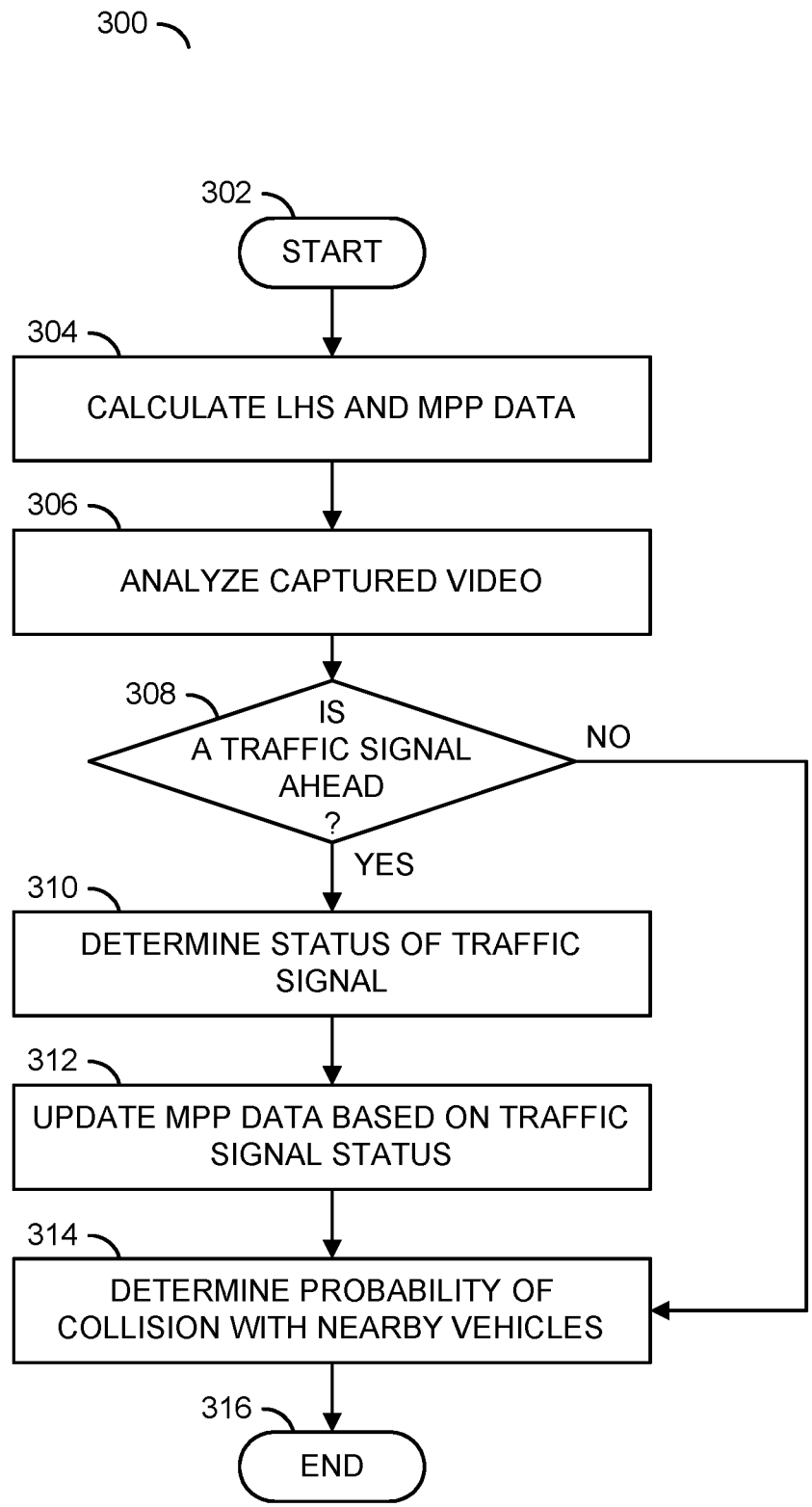
FIG. 11 is a flow diagram illustrating a method for enhancing path data using video analysis.

Referring to FIG. 11, a method (or process) 300 is shown. The method 300 may enhance path data using video analysis. The method 300 generally comprises a step (or state) 302, a step (or state) 304, a step (or state) 306, a decision step (or state) 308, a step (or state) 310, a step (or state) 312, a step (or state) 314, and a step (or state) 316.

The state 302 may start the method 300. In the state 304, the processor 102 may calculate the location and velocity data (e.g., LHS) and/or the path data (e.g., MPP). Next, in the state 306, the vision module 118 may analyze one or more video frames captured by one or more of the sensors 140a-140n. Next, the method 300 may move to the decision state 308.

In the decision state 308, the vision module 118 may determine whether there is a traffic signal ahead. In some embodiments, the processor 102 may use the map information to determine whether or not a traffic signal is ahead (e.g., locations of traffic lights may be embedded as part of the map information).

If there is not a traffic signal ahead, the method 300 may move to the state 314. If there is a traffic signal ahead, the method 300 may move to the state 310.

In the state 310, the vision module 118 may determine the status of the traffic signal. In an example, if the traffic signal is a traffic light, the vision module 118 may determine the color of the light that is currently activated (e.g., red, green, yellow, advanced green, etc.). Next, in the state 312, the processor 102 may update the path data based on the status of the traffic signal (e.g., based on an output from the vision module 118). In an example, the most probable path of the vehicle 30a may be updated to stop at a red traffic light. In the state 314, the processor 102 may determine the probability of collision with any nearby vehicles (e.g., the vehicles 30b-30n)). Next, the method 300 may move to the state 316. The state 316 may end the method 300.

Referring to FIG. 12, a method (or process) 350 is shown. The method 350 may determine most probable path data based on vehicle capabilities. The method 350 generally comprises a step (or state) 352, a step (or state) 354, a step (or state) 356, a step (or state) 358, a step (or state) 360, a decision step (or state) 362, a step (or state) 364, a step (or state) 366, a step (or state) 368, a step (or state) 370, and a step (or state) 372.

The state 352 may start the method 350. Next, in the state 354, the processor 102 may calculate the location, heading, and speed data (e.g., the location and velocity data) from signals received from the GNSS satellites 40a-40n. In an example, the location may be stored in the position coordinates 120a, the heading may be stored in the heading data 120d and the speed may be stored in the speed data 120b of the memory 106. In the state 356, the processor 102 may calculate the most probable path data (e.g., the path data) from the map data 114 (e.g., ADAS horizon data). Next, in the state 358, the module 100 may communicate with the nearby vehicle (e.g., via the antenna 104). In the state 360, the module 100 may receive the location and velocity data (e.g., the signal LHS_B) from the nearby vehicle 30b. Next, the method 350 may move to the decision state 362.

In the decision state 362, the processor 102 may determine whether the nearby vehicle 30b can calculate the most probable path data. In an example, some nearby vehicles may not have a capability of calculating the MPP (e.g., the vehicle 30b does not have access to ADAS Horizon data, the vehicle 30b may not have access to the module 100, etc.) and another vehicle equipped with the module 100 may be able to calculate the MPP for both vehicles. If the nearby vehicle cannot calculate the MPP data, the method 350 may move to the state 364. In the state 364, the processor 102 may use the signal LHS to calculate the most probable path of the nearby vehicle 30b (e.g., the module 100a in the vehicle 30a is used to calculate the MPP for the vehicle 30b). Next, the method 350 may move to the state 368. In the decision state 362, if the nearby vehicle can calculate the MPP data, the method 350 may move to the state 366. In the state 366, the module 100 may receive the MPP data (e.g., MPP_B) calculated by the nearby vehicle 30b. Next, the method 350 may move to the state 368.

In the state 368, the processor 102 may compare the location and velocity data and the path data corresponding to the module 100 (e.g., the signal LHS_A and the signal MPP_A of the vehicle 30a) to the location and velocity data and the path data corresponding to the nearby vehicle (e.g., the signal LHS_B and the signal MPP_B of the vehicle 30b) to determine a probability of a collision. Next, in the state 370, the module 100 may output the probability of a collision with the nearby vehicle 30b. In an example, the probability of a collision may be transmitted to the CAN bus (e.g., the bus 142). One or more components of the vehicle 30a may use the probability of collision to perform a response (e.g., collision avoidance, braking, speeding up, lane centering, selecting an alternate path of travel, initiating a warning to a driver, automatically performing a maneuver, etc.). Next, the method 350 may move to the state 372. The state 372 may end the method 350.

In some embodiments, the module 100 may be implemented as a mobile device. In an example, the mobile device may be a smartphone, a smart watch, a portable wireless device, etc. In some embodiments, the module 100 may be carried by a pedestrian. In an example, the module 100a may be installed in the vehicle 30a and the module 100b may be carried by a pedestrian to warn the vehicle 30a of a potential collision with a pedestrian.

The functions and structures illustrated in the diagrams of FIGS. 1 to 12 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a processor configured to (A) receive (i) signals from GNSS satellites and (ii) map information and (B) execute instructions; and
 a memory configured to store instructions that, when executed by the processor, perform the steps of (i) calculating first location and velocity data based on said signals, (ii) calculating first path data based on said map information, (iii) determining second location and velocity data, (iv) determining second path data based on said map information, (v) performing a comparison of (a) said first location and velocity data and said first path data to (b) said second location and velocity data and said second path data, and (vi) determining a probability of collision based on said comparison, wherein (i) said first and said second path data comprises a most probable path and (ii) said first and said second path data is used to augment said first and said second location and velocity data for determining said probability of collision by indicating a probability of collision, based on roadway information in said map information, that is opposite of one indicated by said first and said second location and velocity data.

2. The apparatus according to claim 1, wherein said first and said second location and velocity data comprises a location, a heading and a speed value.

3. The apparatus according to claim 1, wherein said map information comprises a feature map comprising said roadway information.

4. The apparatus according to claim 3, wherein (i) said roadway information of said feature map comprises at least one of (a) centerline data about roadways and (b) high definition maps of said roadways and (ii) said feature map implements an advanced driver assistance systems horizon comprising information about at least one of upcoming roadway curvature, upcoming roadway slope, upcoming roadway lanes, upcoming speed limits, upcoming traffic signals and upcoming signage.

5. The apparatus according to claim 1, wherein (a) said probability of collision is transmitted as an output to a vehicle system and (b) said vehicle system generates at least one of (i) a warning to a driver and (ii) a signal to implement an automated collision avoidance in response to said output from said apparatus.

6. The apparatus according to claim 1, wherein said second location and velocity data is communicated by at least one of (a) a component of a vehicle and (b) infrastructure.

7. The apparatus according to claim 1, wherein (i) said apparatus is implemented in a first vehicle and (ii) said second path data is received from a second apparatus implemented in another vehicle.

8. An apparatus comprising:
 a processor configured to (A) receive (i) signals from GNSS satellites and (ii) map data comprising roadway information and (B) execute instructions; and
 a memory configured to store instructions that, when executed by the processor, perform the steps of (i) calculating first location and velocity data based on said signals, (ii) calculating first path data by augmenting said first location and velocity data with said roadway information, (iii) receiving second location and velocity data, (iv) calculating second path data by augmenting said second location and velocity data with said roadway information, (v) performing a comparison of (a) said first path data to (b) said second path data, and (vi) determining a probability of collision based on said comparison, wherein said first and said second path data comprises a most probable path and said first and said second path data is used to augment said first and said second location and velocity data for determining said probability of collision by indicating a probability of collision, based on an arrangement of roadways in said map data, that is opposite of one indicated by said first and said second location and velocity data.

9. The apparatus according to claim 8, wherein said first location and velocity data is calculated based on vehicle sensors when said signals are unavailable.

10. The apparatus according to claim 9, wherein said processor is further configured to calculate a dead reckoning solution based on said vehicle sensors.

11. The apparatus according to claim 8, wherein said processor determines whether said collision is possible by indicating that said collision is not possible based on said arrangement of said roadways when said first and said second location and velocity data indicates said collision is imminent.

12. The apparatus according to claim 8, wherein said processor determines whether said collision is possible by indicating that said collision is likely based on said arrangement of said roadways when said first and said second location and velocity data indicates said collision is not possible.

13. The apparatus according to claim 12, wherein said collision is likely because at least one of (i) said roadways intersect each other or (ii) said roadways merge with each other.

14. An apparatus comprising:
 a processor configured to (A) receive (i) signals from GNSS satellites and (ii) video analytics data comprising roadway information and (B) execute instructions; and
 a memory configured to store instructions that, when executed by the processor, perform the steps of (i) calculating first location and velocity data based on said signals, (ii) calculating first path data by augmenting said first location and velocity data with said roadway information, (iii) receiving second location and velocity data, (iv) calculating second path data by augmenting said second location and velocity data with said roadway information, (v) performing a comparison of (a) said first path data to (b) said second path data, and (vi) determining a probability of collision based on said comparison, wherein said roadway information augments said first and said second location and velocity data by indicating whether said collision is possible based on objects detected on a roadway using said video analytics data.

15. The apparatus according to claim 14, wherein said first location and velocity data is calculated based on said video analytics data when said signals are unavailable.

16. The apparatus according to claim 14, wherein said video analytics data is (a) used to determine lane level position and (b) implemented to augment said determination of said probability of collision in lane changing scenarios.

17. The apparatus according to claim 14, wherein said video analytics data is (a) implemented to determine traffic signals and (b) said traffic signals are used to determine at least one of (i) said first path data and (ii) said second path data.

18. The apparatus according to claim 14, wherein said apparatus is implemented on a mobile device as a retrofit for a vehicle.

* * * * *